United States Patent [19]
Nakaie

[11] 4,387,493
[45] Jun. 14, 1983

[54] BINDING BAND CUTTING APPARATUS

[76] Inventor: Tamio Nakaie, 3-11-1 Uenomaru, Akashi-shi, Hyogo-ken, Japan

[21] Appl. No.: 209,827

[22] Filed: Nov. 24, 1980

[51] Int. Cl.³ .............................................. B23P 19/04
[52] U.S. Cl. ..................................... 29/56.5; 83/909; 83/923
[58] Field of Search .................. 29/56.5; 83/923, 924, 83/909, 907

[56] References Cited
U.S. PATENT DOCUMENTS

| | | | |
|---|---|---|---|
| 3,377,687 | 4/1968 | De Chellis | 29/56.5 |
| 3,513,522 | 5/1970 | Thomson | 29/56.5 X |
| 3,643,313 | 2/1972 | Dickinson | 29/56.5 X |
| 4,205,419 | 6/1980 | Aoshima | 29/56.5 |
| 4,219,914 | 9/1980 | Bartzick et al. | 29/56.5 |

*Primary Examiner*—William R. Briggs
*Attorney, Agent, or Firm*—McGlew and Tuttle

[57] ABSTRACT

An automatic cutting apparatus for the binding band on a strip coil comprising a carriage movable towards and away from the strip coil, a pawl guide rod operatively connected to the carriage for movement towards and away from the strip coil, a jaw member pivoted at one end to the carriage and at the other end to the pawl guide rod for opening and closing movement, pawl mechanisms secured to the other end of the jaw member to be guided along the pawl guide rod in response to the opening and closing movement of the jaw member, separate operation mechanisms for the pawl guide rod and jaw member, a primary cutting blade secured to the undersurface of the pawl guide rod, and cooperating feed rollers and feed rollers for shredding and a shredding blade mechanism for further cutting the binding band after the band has been pulled from the strip coil by the pawls and primarily sheared off by the primary cutting blade and then pulled to the shredding position by the feed rollers for delivery to the feed rollers for shredding and in turn to the shredding blade mechanism.

4 Claims, 2 Drawing Figures

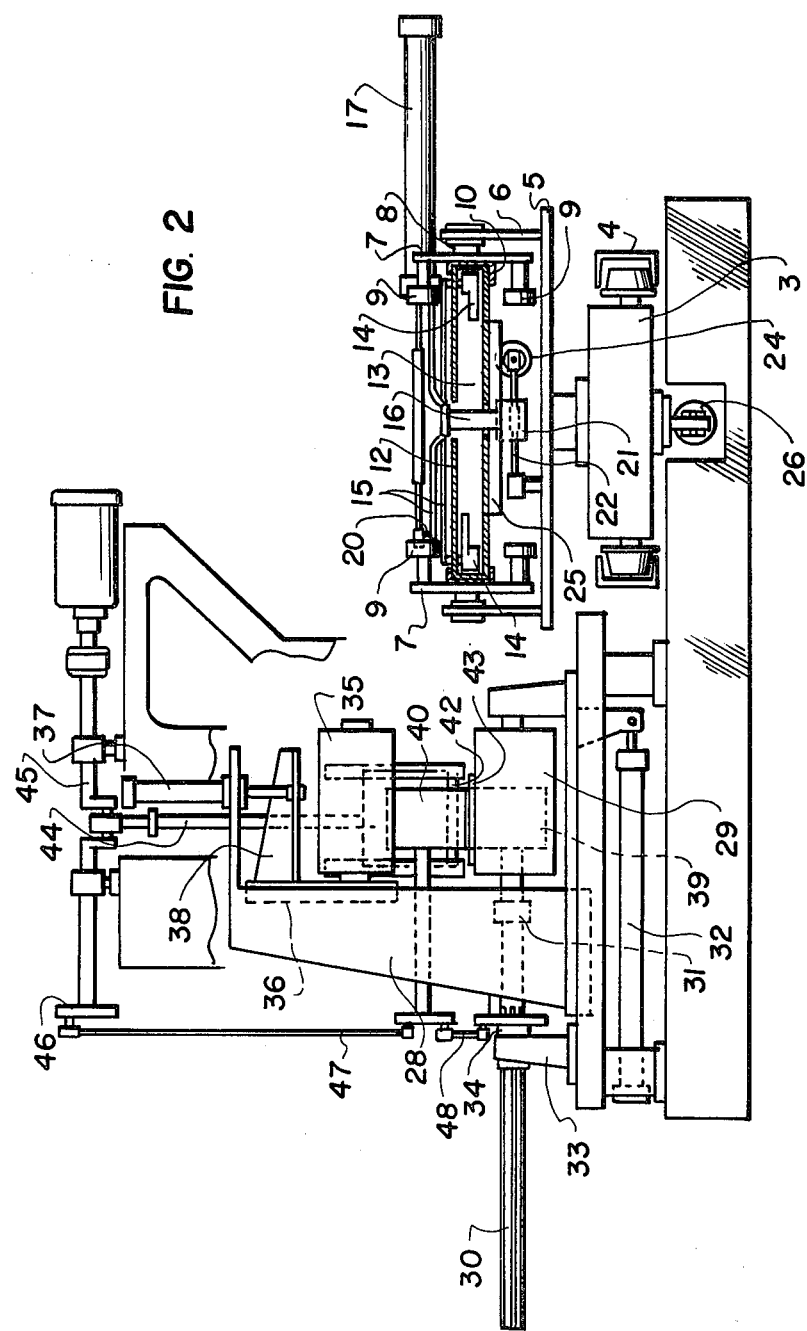

BINDING BAND CUTTING APPARATUS

BACKGROUND OF THE INVENTION

This invention relates to an apparatus for automatically cutting the binding band which binds a strip coil carried on a conveyor and more particularly, to an apparatus for automatically shredding such a binding band so that the shredded binding band can be easily disposed of.

There have been proposed and practically employed a great variety of apparatus for cutting binding bands which bind strip coils in their rolled condition. However, most of the prior art binding band cutting apparatus are of the design in which the binding band is sheared off by pressing a cutting blade against the band. Thus, in order to enhance the cutting efficiency, if the cutting blade is pressed against the binding band with a high force, the strip coil bound by the binding band tends to get damaged and on the other hand, if the cutting blade is pressed against the binding band with a low force, the cutting efficiency is reduced and the disposal of the binding band after the cutting thereof is troublesome.

SUMMARY OF THE INVENTION

Thus, the present invention is to provide an apparatus for automatically cutting the binding band on a strip coil into pieces which can effectively eliminate the disadvantages inherent in the prior art apparatus of this type.

One object of the present invention is to provide an apparatus for automatically cutting the binding band on a strip coil into pieces in a position remote from the strip coil so that the cutting operation can be effectively performed without damaging the strip coil and the cut binding band can be easily disposed of.

The above and other objects and attendant advantages of the present invention will be more easily apparent to those skilled in the art from a reading of the following detailed description in conjunction with the accompanying drawings which show one preferred embodiment of the invention for illustration purpose only, but not for limiting the scope of the same in any way.

BRIEF DESCRIPTION OF THE DRAWINGS

The accompanying drawings show one preferred embodiment of binding band cutting apparatus constructed in accordance with the principle of the present invention in which:

FIG. 2 is a side elevational view of the binding band cutting apparatus.

PREFERRED EMBODIMENT OF THE INVENTION

Figure 1:
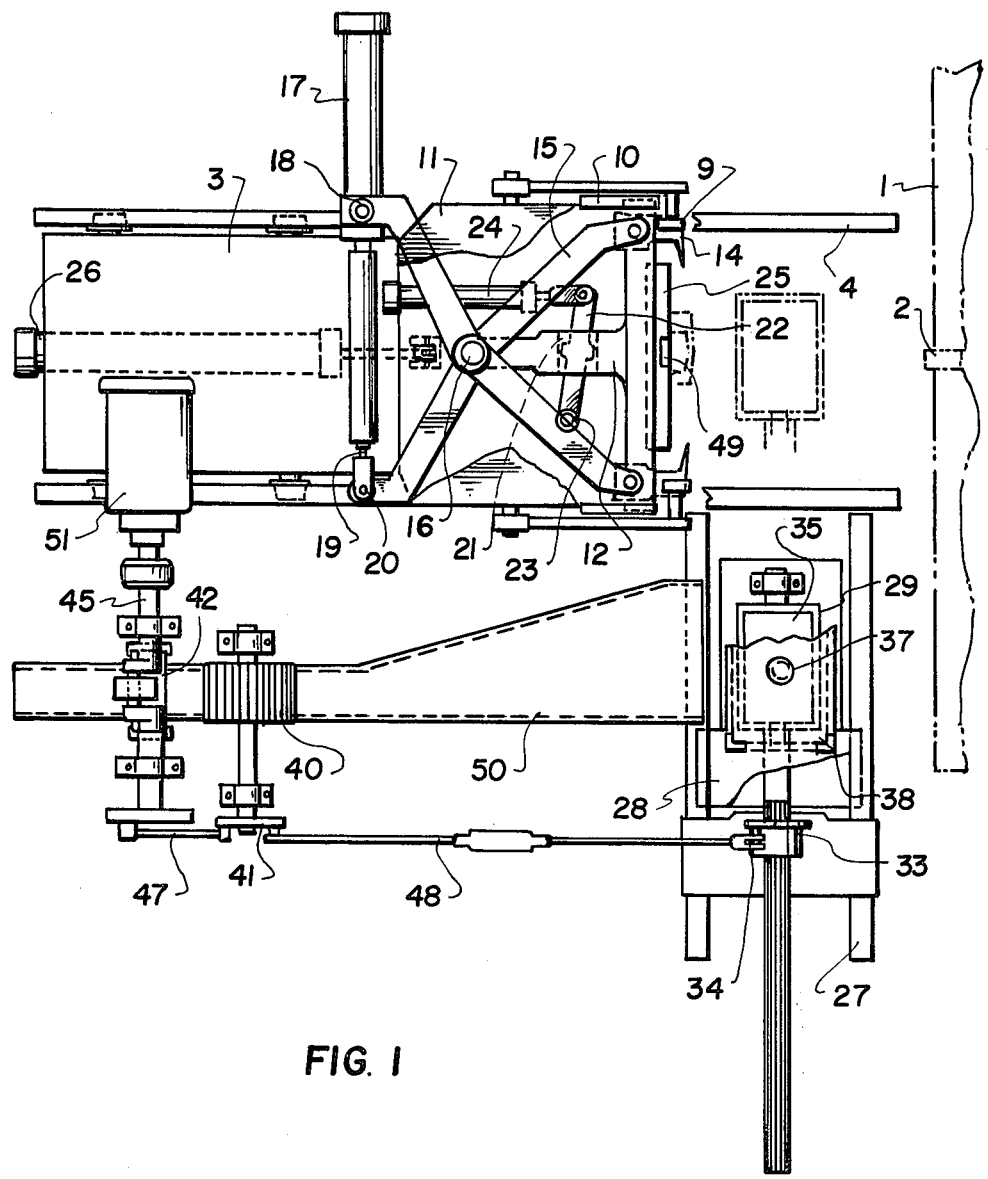
FIG. 1 is a top plan view of the binding band cutting apparatus.

The present invention will be now described referring to the accompanying drawings.

In FIG. 1, reference numeral 1 denotes a strip coil (a roll of a length of steel sheet having a diameter ranging from about 1,000 mm to about 2,050 mm) which is carried on a conveyor (not shown) and reference numeral 2 denotes a binding band such as a steel band which binds the strip coil 1. A wheeled carriage 3 is guided along a pair of parallel and spaced rails 4 which extend in parallel to the axis of the strip coil 1, i.e. in parallel to the corresponding uncoiled longitudinal axis of the strip and at right angles to the coil axis, and such carriage has its longitudinal axis adapted to be aligned with the binding band 2. A mounting plate 5 is provided on the front part of the carriage 3 and a pair of upright supports 6 are provided adjacent to the left-hand and right-hand side edges of the mounting plate 5 (as seen in FIG. 2). A pair of probe rods 7 are pivotably mounted on horizontal stub shafts 8 which are in turn journalled in the supports 6 and the probe rods are positioned inwardly from the associated supports 6 and bent into a substantially L-shape forwardly (the right-hand direction as seen in FIG. 1) and such that the longer legs of the probe rods extend toward each other.

A pair of guide rollers 9 are mounted on horizontal stub shafts which are in turn journalled at the upper and lower ends of each of the probe rods 7. A pair of parallel and spaced pawl guide rails 10 extend in parallel to the longitudinal axis of the carriage 3 and are secured to the opposite side edges of a top cover 11 on the front part thereof which is in turn secured at the opposite side edges to the stub shaft 8.

A substantially T-shaped pawl guide rod 12 is received at the opposite side edges in the pawl guide rails 10 and guided along the rails for slidable movement forwardly and backwardly (the right-hand and left-hand directions as seen in FIG. 1). The pawl guide rod 12 is formed on the front side face with a pawl guide groove 13 for slidably receiving a pair of pawls 14 which have a substantially L-shape and are in turn secured to a jaw member 15. As more clearly shown in FIG. 2, the L-shaped pawls 14 are in inverse or inverted disposition relative to each other so as to position the horizontal legs of the pawls in different heights. The jaw member 15 comprises a pair of plates 15 which intersect each other and are laid one upon another. The plates 15 are pivoted to each other in substantially the centers thereof by means of a vertical pin 16 so that the front half portion and rear half portion of the jaw member 15 can close and open. The pawls 14 are secured to the leading ends of the plates 15 (the righ-hand ends as seen in FIG. 1). A cylinder 17 is secured to the rear end of one of the plates 15 at 18 and has an extensible rod 19 which is pivoted to the rear end of the other plate 15 at 20.

The pawl guide rod 12 is formed on the undersurface in the center thereof with a transverse notched groove 21 and a link rod 22 which has a bulge is arranged with the bulge loosely received in the notched groove 21. The link rod 22 is pivoted at one end to a pivot pin 23 and at the other end to a cylinder 24.

A primary cutting blade 25 is secured to the undersurface of the transverse portion of the T-shaped pawl guide rod 12 with the cutting edge extending beyond the front edge of the guide rod and a carriage feed cylinder 26 is provided on the undersurface of the carriage 3. A pair of parallel and spaced guide beds 27 are positioned at right angles to the guide rails 4 adjacent to the leading ends of the guide rails. A roller carriage 28 is adapted to move slidably on the guide beds 27 in the two opposite directions at right angles to the axis of the strip coil 1, i.e. at right angles to the corresponding uncoiled longitudinal axis of the strip and in parallel to the coil axis, and has a lower feed roller 29 rotatably journalled thereon and having its axis parallel to the guide beds 27. Reference numeral 30 denotes a spline formed on the outer periphery of the outer end of the rotary shaft on which the lower feed roller 29 is mounted and reference numeral 31 denotes a known one-way clutch mounted on the lower feed roller shaft at an intermediate point between the opposite ends of the shaft.

A cylinder 32 is mounted on a lower portion of the roller carriage 28 and a pedestal 33 journals the splined shaft for the lower feed roller 29. The inner surface of the bearing portion of the pedestal 33 is formed with a female spline and a transmission sleeve 34 having a flange at one end is loosely received in the bearing portion of the pedestal 33. The splined shaft slidably extends through the transmission sleeve 34.

An upper feed roller 35 is provided above and in parallel to the lower feed roller 29 and journalled in a carriage 36 which is in turn slidably received in the roller carriage 28 for vertical movement.

A vertical cylinder 37 is secured to the top of the carriage 28 and has an extensible rod the leading end of which is secured to a pusher piece 38 which in turn extends integrally and laterally from the carriage 36. Reference numeral 39 denotes a feed roller for shredding which is journalled on a shaft (not shown) in parallel to and in substantially the same vertical plane as the lower feed roller 29 behind the lower feed roller 29 when the roller 29 is in its normal position (the retracted position as shown in FIG. 1) before the roller 29 moves. Reference numeral 40 denotes an upper feed roller for shredding which is journalled on the shaft which extends through the carriage 28 in a position above and in parallel to the shaft on which the lower feed roller for shredding 39 is journalled.

A transmission disc 41 is secured to the outer end of the shaft on which the upper feed roller for shredding 40 is mounted. Reference numeral 42 denotes an upper shredding blade provided behind the feed roller for shredding 40 for vertical movement and having a downwardly directed cutting edge. Reference numeral 43 denotes a lower stationary shredding blade positioned below the upper shredding blade 42 and having an upwardly directed cutting edge which opposes the downwardly directed cutting edge on the upper shredding blade 41.

A connector rod 44 is secured to and extends upwardly from the upper surface of the upper shredding blade 42 and a prime mover shaft 45 is operatively connected in an eccentric portion thereof to the upper end of the connector rod 44 and a transmission disc 46 is secured to one end of the prime mover shaft 45 (the left-hand end as seen in FIG. 2). A connector rod 47 operatively connects between the transmission discs 41 and 46. A link 48 connects between the transmission disc 41 and the flange on the transmission sleeve 34. The cutting blade 25 has a rubber pad 49 attached thereto in substantially the center of the blade. A chute 50 having a substantially square cross-section extends rearwardly from a position adjacent to the lower feed roller 29 to a position adjacent to the stationary shredding blade 43. Reference numeral 51 denotes a prime mover attached to the other end of the prime mover shaft 45.

With the above-mentioned construction and arrangement of the components of the binding band cutting apparatus according to the present invention, in operation, when the strip coil 1 on a conveyor has been carried to a predetermined position where the binding band 2 which holds the strip coil in its rolled condition is to be cut off, a sensor (not shown) senses the strip coil 1 and actuates the cylinder 26 to extend the rod. The extension of the cylinder rod advances the carriage 3 towards the strip coil 1. Since the guide rollers 9 at the leading ends of the probe rods 7 are adapted to move upwardly and downwardly about the respectively associated stub shafts 8, all the guide rollers 9 accommodate the curved contour of the strip coil 1 so as to closely engage the strip coil. Thereafter, the cylinder 24 is actuated to extend the rod and the extension of the rod of the cylinder 24 causes the feed rod 22 to pivot about the pivot pin which pivotally connects the link rod 22 to the rod of the cylinder 24. The pivotal movement of the link rod 22 pushes the pawl guide rod 12 forwardly by means of the bulge on the link rod 22 which is received in the transverse groove 21 in the pawl guide rod 12 whereby the pawls 14 advance to a position where the pawls engage the strip coil 1. Thereafter, the cylinder 17 is actuated to retract the rod 19 thereof and the retraction of the rod of the cylinder 17 closes the front half portion of the jaw member 15 whereby the pawls 14 slidably move along the guide groove 13 towards each other. The pawls 14 move towards each other until the bent leading ends of the pawls 14 force into the clearance between the strip coil 1 and binding band 2 to grip the band. At this time, the intersecting plates 15 are preferably left free somewhat so that the pawls 14 can accommodate a slight deviation of the position of the binding band 2 on the strip coil 1.

With the pawls 14 gripping the binding band 2 in the manner as mentioned hereinabove, when the rod of the cylinder 24 is caused to retract, the pawl guide rod 12 retracts away from the strip coil 1 and as a result, the pawls 14 also retract away from the strip coil 1 while gripping the binding band 2 therebetween. At this time, since the binding band 2 gripped by the pawls 14 is pulled away from the strip coil 1 being pressed against the primary cutting blade 25, the binding band 2 is sheared off by the cutting blade 25. At this time, the upper cut end of the sheared strip band 2 is pushed against the rubber pad 49 by the retracting pawls 14 so as to be caught by the rubber pad 49. If a suitable known sensor (a limit switch, for example) is provided in a position where the sheared binding band 2 contacts the sensor as the pawls 14 retract, the shearing of the binding band 2 can be positively confirmed. When the sensor senses the shearing of the binding band 2, the sensor actuates the cylinder 26 to cause the rod of the cylinder to retract whereby the carriage 3 retracts with the pawls 14 gripping the sheared binding band 2.

Thereafter, the cylinder 32 is actuated to extend the rod of the cylinder and the extension of the rod causes the carriage 28 to slidably move towards the pawl guide rod 12 until the lower feed roller 29 and upper feed roller 35 reach the sheared binding band 2 whereupon the cylinder 37 is actuated to extend the rod of the cylinder. The extension of the rod of the cylinder 37 causes the carriage 36 to move downwardly until the upper feed roller 35 engages the upper surface of the binding band 2 whereby the lower and upper feed rollers 29, 35 grip the binding band 2 by the bottom and upper surfaces of the band.

Thereafter, the cylinder 24 is actuated to extend the rod of the cylinder and the extension of the rod of the cylinder 24 causes the link rod 22 to pivot so as to advance the pawls 14 whereupon the rubber pad 49 releases its grip on the cut end of the binding band 2 which is up to now held on the rubber pad 49. Thereafter, the cylinder 17 is actuated to extend the rod of the cylinder whereupon the front half portion of the grip member 15 opens and as a result, the pawls 14 move away from each other along the groove 13. Thereafter, the cylinder 32 is actuated to retract the rod of the cylinder so as to retract the carriage 28 away from the pawl guide rod 12 to the original position as shown in FIG. 2 with the lower and upper feed rollers 29, 35 gripping the sheared binding band 2 from below and above. Thereafter, the prime mover 51 is energized to rotate the shaft 45 so as to move the upper shreading blade 42 upwardly and downwardly through the crank mechanism and the rotation of the prime mover shaft 45 is transmitted through the connection rods 47, 48 to the shafts on which the lower feed roller 29 and upper feed roller for shredding 40 are mounted, respectively. Since the one-way clutches 31 are mounted on the shafts for the lower feed roller 29 and upper feed roller for shredding 40 (only the one-way clutch 31 associated with the spline shaft 30 is shown in FIG. 2), an intermittent rotational movement occurs so that the corresponding feed rollers 29, 40 rotate only when the carriage 28 transmission system of rods 47, 48 moves on the onward stroke, but do not rotate on the return stroke (only the shafts rotate). Thus, after having been cut and moved to the above-mentioned position, the binding band 2 is intermittently fed from the lower feed roller 29 through the chute 50 to the lower feed roller for shredding 39 positioned rearwardly from the roller 29 by a predetermined distance in a repeated cycle and when the cut binding band 2 reaches the lower feed roller for shredding 39, the binding band 2 is gripped between the lower and upper feed rollers for shredding 39, 40 and fed to the upper shredding blade 42. Therefore, when the arrangement is so made that the timing of the intermittent feed of the binding band 2 coincides with that of the downward movement of the upper cutting blade 42, the binding bands 2 on strip coils 1 which are in succession carried to the cutting apparatus can be in succession shredded and discharged out of the apparatus.

Thus, according to the present invention, since the binding band 2 is sheared off in a position remote from the strip coil 1, the shearing operation can be performed without inflicting any damage on the strip coil and the binding band is shredded and then discharged out of the cutting apparatus and accordingly, the shredded binding bands can be easily disposed of by a bucket or the like container resulting in improvement of the operation efficiency.

While only one embodiment of the invention has been shown and described in detail, it will be understood that the same is for illustration purpose only and not to be taken as a definition of the invention, reference being had for this purpose to the appended claims.

What is claimed is:

1. An apparatus for cutting the binding band on a strip coil which comprises a carriage movable towards and away from said strip coil in parallel to the strip axis of the strip coil when the strip coil is carried to said apparatus, a substantially T-shaped pawl guide rod operatively connected to the leading end of said carriage for movement towards and away from said strip coil and having a transverse pawl guide groove in the front face of the transverse portion of said T-shaped pawl guide rod, a substantially X-shaped jaw member including a pair of plates intersecting each other and pivoted in the centers of the plates to each other and at the leading ends to the opposite ends of said transverse portion of the T-shaped pawl guide rod, a pair of pawls each having a pointed leading end bent inwardly and secured to said leading ends of the plates of the jaw member to be slidably guided along said pawl guide groove in the T-shaped pawl guide rod, a first cylinder operatively connected to said pawl guide rod for operating the guide rod, a second cylinder operatively connected to the rear end of said jaw member for operating the jaw member, a pair of substantially L-shaped probe rods journalled on the opposite sides of said carriage with the longer legs of said probe rods extending towards each other, a primary cutting blade secured to the undersurface of said transverse portion of the T-shaped pawl guide rod, a rubber pad secured to said cutting blade substantially in the center of the blade, a second carriage provided adjacent to said transverse portion of the T-shaped pawl guide rod for slidable movement towards and away from said strip coil at right angles to the axis of said first-mentioned carriage, a lower feed roller rotatably mounted in a lower portion of said second carriage, a splined shaft journalled in said second carriage for rotatably supporting said lower feed roller, an upper feed roller positioned above said lower feed roller for movement towards and away from said lower feed roller, a third cylinder for operating said upper feed roller, feed rollers for shredding positioned rearwardly from said lower feed roller, and shredding blade means positioned rearwardly from said feed rollers for shredding and mounted for upward and downward movement by means of a crank mechanism, whereby said shredding blade means cooperate with said feed rollers for shredding, in further cutting said binding band into pieces after the binding band has been pulled from the strip coil by the pawls and primarily sheared off by said primary cutting blade and then pulled to the shredding blade means by said feed rollers on said second carriage for delivery to the feed rollers for shredding and in turn to the shredding blade means.

2. Apparatus for cutting the binding band on a strip coil which comprises a carriage operatively arranged for movement relative to the strip coil between a remote position spaced from the strip coil and a proximate position adjacent the strip coil, and having probe means for engaging the strip coil when the carriage is in the proximate position, lateral pawl guide means operatively mounted on the carriage for movement relative thereto between a retracted position and an extended position, and having a primary cutting blade operatively positioned thereon relative to the binding band so as to be adjacent the band when the pawl guide means is in extended position and the carriage is in the proximate position, a pair of laterally opposed gripping pawl means operatively guided in the pawl guide means for lateral movement between an open releasing position and a closed gripping position, and arranged for movement to closed position for gripping the binding band therebetween when the probe means engage the strip coil and the pawl guide means is in extended position and in turn for pulling the band away from the strip coil and against the primary cutting blade for cutting the band upon moving the pawl guide means to retracted position and for continued gripping of the cut band thereby in such retracted position of the pawl guide means, and band engaging and pulling means arranged for movement relative to the strip coil between a discharge position spaced from the carriage and strip coil and an intervening transfer position intermediate the strip coil and carriage when the carriage is in remote position, and further arranged for operation at the transfer position for engaging the cut band during the continued gripping thereof by the pawl means, and upon moving the pawl means to open position for releasing the cut band, in turn still further arranged for pulling the cut band engaged thereby along therewith to the discharge position.

3. Apparatus according to claim 2, wherein a shredding blade means is arranged adjacent the discharge position of the band engaging and pulling means, and shredding feed means are provided for operatively receiving the cut band from the band engaging and pulling means and feeding the cut band to the shredding blade means for further cutting said band successively into pieces.

4. Apparatus according to claim 3, wherein the means for moving the pawl means include a closable jaw means operatively connected to the pawl means and pawl guide means for correspondingly moving the pawl means to closed position upon closing the jaw means and to open position upon opening the jaw means, and wherein the band engaging and pulling means include a pair of feed rollers mounted on a second carriage which is movable between the discharge position and transfer position and on which the feed rollers are arranged for movement between a spaced apart position for insertion of the cut band therebetween and a contact position for engaging the cut band therebetween and for pulling the cut band to the discharge position and thereat for feeding the cut band to the shredding feed means.

* * * * *